United States Patent [19]
Chi Yu

[11] Patent Number: 4,789,515
[45] Date of Patent: Dec. 6, 1988

[54] METHOD FOR FABRICATING STIFF POLYMERIC PLASTIC SLATS FOR VENETIAN BLINDS

[76] Inventor: Simon S. Chi Yu, 4090 Whittle Ave., Oakland, Calif. 94602

[21] Appl. No.: 142,431

[22] Filed: Jan. 11, 1988

[51] Int. Cl.⁴ .................. B29C 53/04; B29C 53/18
[52] U.S. Cl. .................... 264/285; 264/339; 264/340
[58] Field of Search ............ 264/285, 295, 339, 160, 264/340

[56] References Cited
U.S. PATENT DOCUMENTS

| | | | |
|---|---|---|---|
| 2,779,388 | 1/1957 | Quoff | 264/285 |
| 2,848,751 | 8/1958 | Vernon | 264/285 |
| 3,197,536 | 7/1965 | French | 264/285 |
| 4,711,005 | 12/1987 | Chang | 264/160 |

Primary Examiner—James Lowe
Attorney, Agent, or Firm—Norman E. Reitz

[57] ABSTRACT

A method of producing stiff polymeric plastic slats incorporates the steps of (a) feeding a reel of planar polymeric plastic film into a roller system which includes at least one pair of rotatable entrance guide rollers; (b) guiding the polymeric plastic film through at least one pair of rotatable line marker rollers; (c) passing the film through at least one pair of truncated rollers to produce a bend in said film of 100 degrees or more; (d) passing the film through a pair of nipping rollers to convert said bend to a fold of between 120 and 180 degrees to thereby produce tension and compression in a ridge region; and, (e) flattening said film out to its final, fixed shape by drawing through a pair of soft, rotatable wheels.

9 Claims, 3 Drawing Sheets

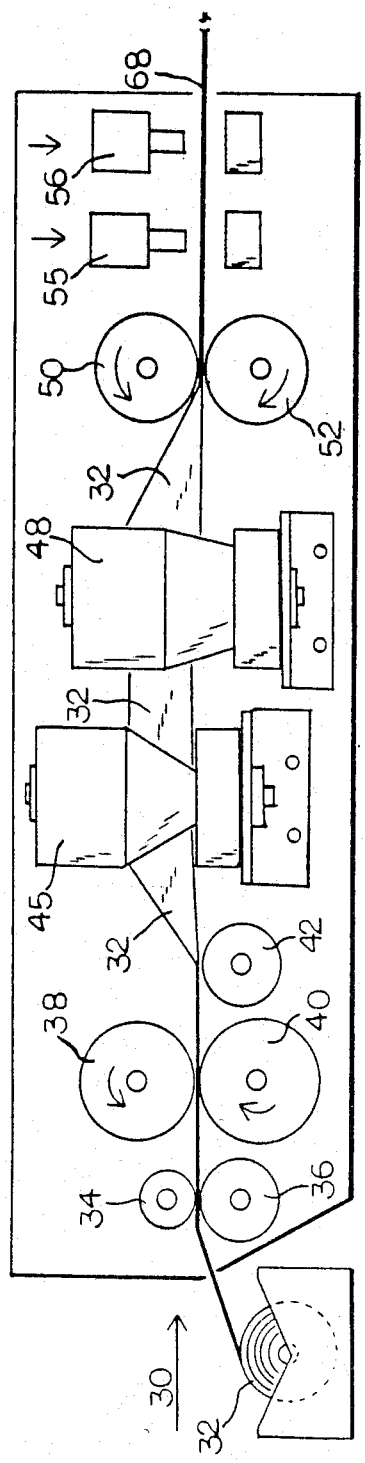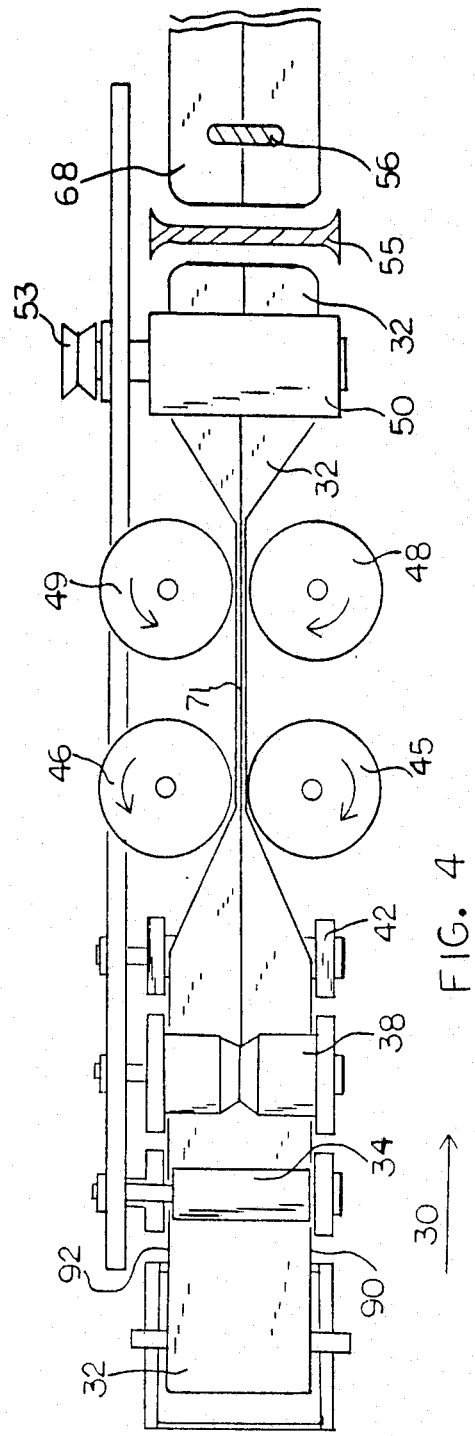
FIG. 3
FIG. 4

METHOD FOR FABRICATING STIFF POLYMERIC PLASTIC SLATS FOR VENETIAN BLINDS

FIELD OF THE INVENTION

The present invention is related to venetian blinds, and more particularly, is related to a method for fabricating linear venetian blind slats from a reel of flexible transparent polyester film.

DESCRIPTION OF THE PRIOR ART

Over the last decade, the occurrence of energy shortages has spurred the introduction of numerous conservation techniques for buildings. One of the numerous ideas advanced involves reducing the appreciable heat losses and gains through plain glass windows by placing blinds, sun shades and the like over the windows. Venetian blinds in particular are especially effective in controlling heat energy from the sun and from building lights. When blinds are installed over windows, light and glare are cut, but an outside view cannot be retained simultaneously with cutting light and glare unless transparent materials are utilized. Since the majority of venetian blinds are being constructed with non-transparent aluminum slats, some attempt has been made to make the aluminum slat look transparent by punching many tiny holes in the slats or by using extruded polyvinyl chloride or polycarbonate to make transparent slats. However, these past efforts have been expensive and have not been energy efficient.

In prior methods of producing thermoplastic polymeric slats such as slats from polyvinyl chloride or polycarbonate, color pigment has been mixed with polymeric resin, then heated and extruded through a concave-shaped die. Once the hot and soft slat leaves the extrusion die, it slowly passes through a series of cooling stations. Then it must be cut to the maximum possible length, removed and transferred to another machine for additional hole punching and cutting to the required length.

This metod creates a great deal of waste material and consumes large amounts of electrical energy for heating and water for cooling. Also, good optical clarity in transparent slats may not always result from this method since direct extrusion of this kind often causes streaks in the slats when the extrusion die becomes dirty.

While plastic slats may be fabricated from transparent polymeric plastic films such as polyvinyl chloride, polycarbonate, polyester and the like, it is rare that acceptable transparent plastic slats can be successfully fabricated by the heat setting or extrusion methods since any heat setting in a planar plastic film may not hold over time and since the extrusion method may cause unwanted streaks and unnecessary material waste.

These two methods as mentioned above cause problems such as bowing, either upward or downward, twisting, very slow production speed, or the consumption of large amounts of electrical energy and/or water. Another problem of this method of fabrication is that the slats may be sensitive to environmental thermal effects encountered over the life of the slats which may cause them to loose their shape.

SUMMARY OF THE INVENTION

The method of the present invention embodies a series of steps which fixes a shape in a polymeric plastic film by utilizing internal molecular volummetric changes within the film. This internal molecular volummetric change occurs when external forces of tension and compression act simultaneously on a polymeric plastic film, such as on a polyester film. The finished product is a stiff and linear slat suitable for use with venetian blinds. Expensive heating and cooling steps are not required.

The method steps of the present invention are (a) feeding a reel of planar polymeric plastic film into a roller system which includes at least one pair of rotatable entrance guide rollers; (b) guiding said polymeric plastic film through at least one pair of rotatable line marker rollers; (c) passing said film through at least one pair of truncated rollers to produce a bend in said film; (d) passing said film through a pair of nipping rollers to convert said bend to a fold of approximately 180 degrees to thereby produce tension and compression in a ridge region; and, (e) flattening said film out to its final, fixed shape by drawing through a pair of soft, rotatable wheels.

It is an objective of the present invention to fabricate plastic slats in a high-speed operation without the need to use cooling water.

It is an objective of the present invention to fabricate transparent plastic slats from a continuous elongated flexible planar plastic film material and to stiffen, shape, cut, punch, and eject in a continuous operation without transfer to other equipment.

A further objective of the present invention is to provide a method which produces linear slats having minimal visual distortion when deployed on a window.

Another objective of the present invention is to provide a method of fabrication which produces transparent slats to be shaped from a reflective coated, dyed and laminated material which are not particularly temperature sensitive and which are able to retain their physical shape at elevated temperatures.

Furthermore, the method of the present invention produces venetian blind slats which will not twist, bend, bow, either up or down, and which are not streaked, scratched or warped.

BRIEF DESCRIPTION OF THE DRAWINGS

A more complete understanding of the advantages and capabilities of the present invention will become apparent in connection with the accompanying drawings which are incorporated herein by reference and in which:

FIG. 3 is a side view of apparatus for fabricating a stiffened plastic slat from a reel of planar plastic film according to the method of the present invention;

FIG. 4 is an plan view of the apparatus of FIG. 3;

DETAILED DESCRIPTION OF THE PREFERRED EMBODIMENTS

Figure 1:
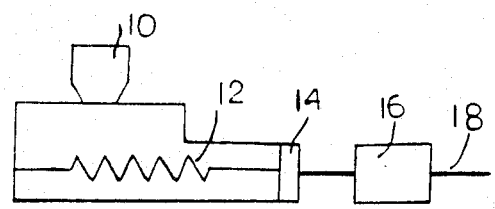
FIG. 1 shows a side view of an extrusion method for producing a plastic slat where the plastic slat is extruded out through a concave-shaped die and then enters into a cooling fixture.
Figure 2:
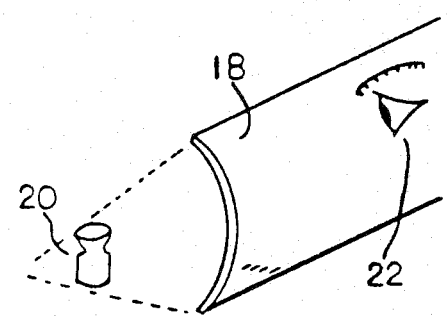
FIG. 2 is a perspective view of a plastic slat produced by either an extrusion or heat-setting method through which a viewer from the convex side may experience an optical illusion.

A method for fabricating polymeric plastic slats is described in FIGS. 1–12 in conjunction with suitable apparatus for carrying out the method. Referring to FIG. 1, a typical slat extrusion apparatus is shown in which plastic resin is introduced into metering tank 10. The resin is melted by electric heater 12 and extruded out through die 14 to form a slat which is then cooled by water cooling fixture 16. The plastic slat 18 exits to be transferred to other apparatus for re-cutting and punching. In FIG. 2 a concave-shaped plastic slat 18 of the prior art is shown which may cause an optical illusion as viewer 22 sees an object 20.

Figure 5B:
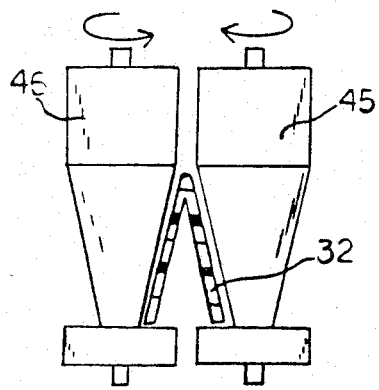
FIG. 5B is a frontal view of a pair of truncated rotatable rollers which bends the plastic slat after the center line has been marked.
Figure 5C:
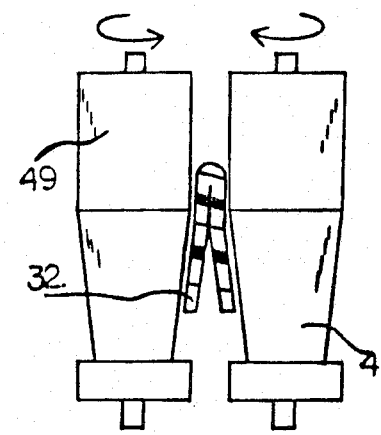
FIG. 5C is a frontal view of a pair of rotatable nipping rollers which folds the bended plastic slat once it exits from the pair of truncated rollers.
Figure 6A:
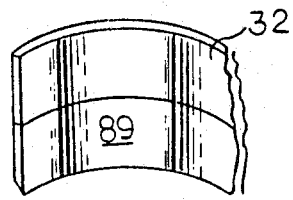
FIG. 6A is a perspective view of a pre-treated, slightly bowed planar plastic film after the center line has been marked.
Figure 6B:
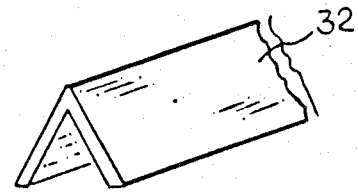
FIG. 6B is a perspective view of a slat emerging from the truncated rollers of FIG. 5B.
Figure 6C:
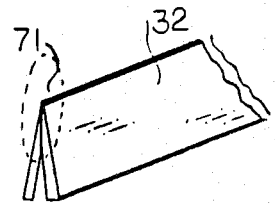
FIG. 6C is a perspective view of a folded slat after passing through the pair of nipping rollers of FIG. 5C.
Figure 6D:
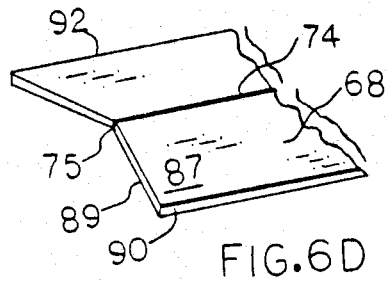
FIG. 6D is a perspective view of a transparent slat which has been unfolded and pulled out by the pair of rotating, motor-driven rubber wheels of FIG. 5D.

FIG. 3 is a side view of apparatus for practicing the method of the present invention showing a reel of planar polyester film 32 being fed to a pair of rotatable entrance guides 34, 36 in the direction of arrow 30. Tihs film may be transparent, tinted, reflective, laminated or be of combined tinted-reflected material. It is preferably of a thickness from 0.005 inches to 0.030 inches. Next the film passes by and makes contact with a pair of rotatable center line markers 38, 40 which establishes a crease line on the slats. The slat then exits through an exit roller guide 42. Thereafter, the slat moves on to a pair of truncated rollers 45, 46 [See also the complementary plan view of FIG. 4]. Because polymeric plastic films, such as polyester films and the like, behave very much like a flat spring sheet, the rotatable center line markers, 38, 40 produces a high local stress concentration along the center of the elongated polyester film 32 to help induce the initial bend of approximately 120 degrees by a pair of truncated rollers 45,46. After creasing, a ridge shape is visible as indicated in FIGS. 5B and 6B.

Figure 9:
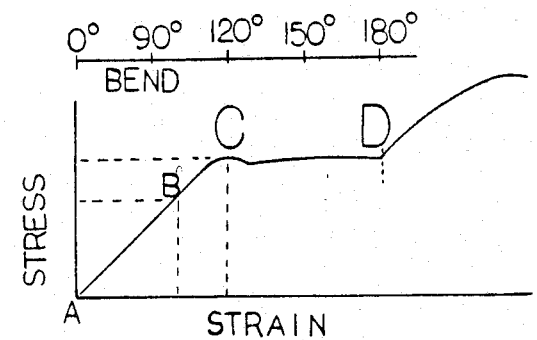
FIG. 9 is a typical stress-strain curve of a polymeric plastic film, such as the polyester film used in the present invention, which operates optimally in the regions C and D.
Figure 10A:
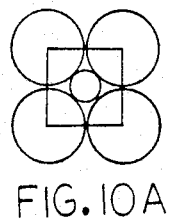
FIG. 10A is a schematic diagram representing the structure of molecules of solids such as polyester film in its free-standing state.
Figure 10B:
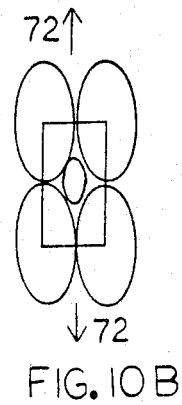
FIG. 10B is a view derived from FIG. 10A after the molecules have been stretched due to the tension exerted on the upper surface of the plastic film, i.e. on the outside of the ridge region of the slat.
Figure 10C:
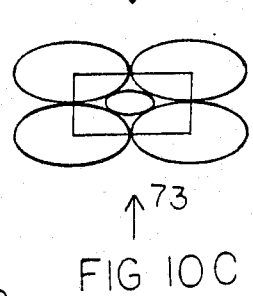
FIG. 10C is a further view derived from FIG. 10A after the molecules have been compressed due to compression on the bottom surface of the plastic film, i.e. on the underside of the ridge region.
Figure 12:
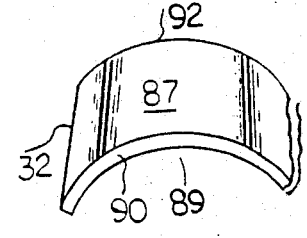
FIG. 12 is a perspective view of a piece of pretreated planar plastic film which was pretreated to compensate for the curvature introduced by the combined effect of tension and compression.

The method of the present invention is aimed at fixing the bend in the polyester film permanently in a linear ridge line so the resulting slat is linear. The molecule underpinning for this methodology may be understood with reference to FIGS. 8, 9 and 7. In FIG. 8 a piece of planar polyester film 32, preferably about 0.01 inch thick is illustrated. Since the film 32 is to be bent from 0 degrees to 120 degres, a ridge-shaped fold as indicated in FIGS. 5B and 6B is produced. But, since polyester film 32 may have a typical stress-strain curve as shown in FIG. 9 wherein for fold angles less than 120 degrees the film and may flex back to the starting point of zero degrees at point A over a period of time, especially if high temperatures are encountered. Thus, it is necessary to fold the polyester film 32 beyond point C to about point D which corresponds to a fold of 180 degrees. At this point a change occurs in the molecular structure which is not readily reversible. This change is explained by examination of the several FIGS. 10 and of FIG. 7. FIGS. 10B and 10C illustrate, respectively, the changes in molecular structure from tension and from compression along the ridge line. These changes are shown pictorially in FIG. 7 wherein the tension region 72 results in stretching of the surface and the compression of the region 73 results in a compacting of the surface. Folding to near 180 degrees occurs after the film 32 leaves the truncated rollers 45, 46 and passes through the nipping rollers 48,49; at this step the film is tightly pressed at the ridge line between the nipping rollers 48,49. The tension 72 of FIG. 10B and the compression 73 of FIG. 10C produces a permanent structural change in the area corresponding to the top of ridge 74 and to the bottom of the ridge 75 of the polyester film 32. Thus, the nipping rollers 48, 49 cause the top surface of the slat being formed to tension stretch and the bottom surface of the slat being formed to compression press in the vicinity of the region where the center line was marked.

Figure 5A:
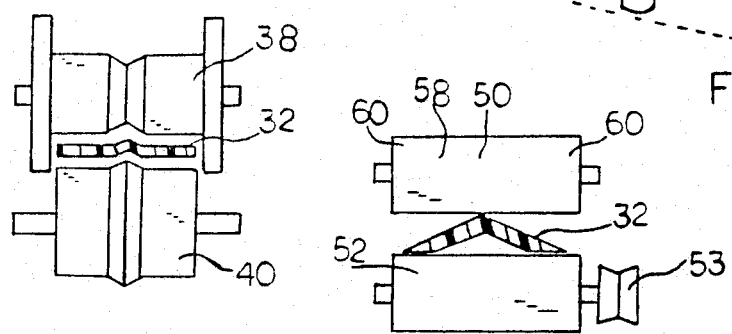
FIG. 5A is a frontal view of a pair of rotatable center line marker rollers, which shows a piece of planar plastic film seated between the rollers.
Figure 5D:
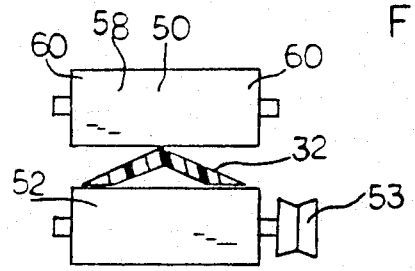
FIG. 5D is a frontal view of a pair of rotating motor-driven rubber wheels which pull and unfold the shaped slat to its final ridge configuration.

In FIG. 5D, the step of pulling the slat out by a pair of rotating rubber wheels 50, 52 by driving motor 53 is shown. The slat 32 attains its final folded shape, exemplified by ridge portion 71 of FIG. 7, which it will always retain, regardless of the shape of bottom rubber wheel 52 so long as the center diameter 58 of the upper rubber wheel 50 is equal to or smaller than the diameter of both ends 60 of rubber wheel 50, to prevent bending in the reverse direction.

Figure 7:
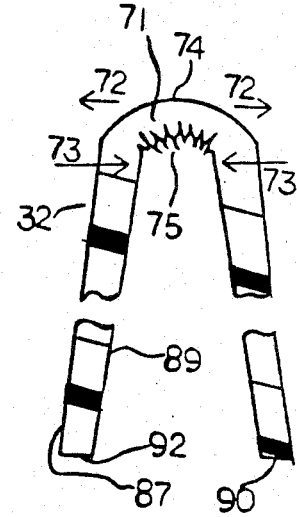
FIG. 7 is a cross-sectional view of the slat of FIG. 6C, taken from the region circled. The cross section of the folded region is highly exaggerated to show the tension and compression effect, which causes the folded region to be permanently deformed.
Figure 8:
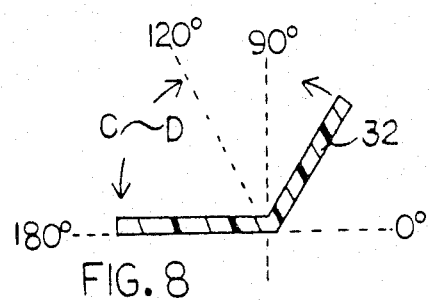
FIG. 8 is a cross-sectional view of a plastic slat defining the fold angle and showing the preferred C–D angle cross-refernced from FIG. 9.
Figure 11:
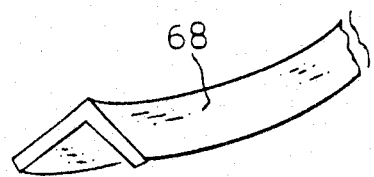
FIG. 11 is a perspective view of a curved, stiffened plastic slat resulting from the lengthened bottom surface caused by compression and the corresponding shortened top surface caused by tension.

Referenced in FIG. 11 is a curved polyester slat 68 which would be produced by the effect of the pair of rotatable nipping rollers 48, 49 during compression 73 and tension 72 due to the tension along the outer surface and the compression along the inner surface as shown in FIG. 7. The method of the present invention preferrably corrects for this tendency to curve by inserting a film which has been pretreated to be curved in the opposite direction such as by being coiled in a reel.

After passing through the rotating rubber wheels 50, 52, also known as recovery rollers 50, 52, a transparent polyester slat 68 is obtained without any bends, twists or curves. Finally, punching 56 and cutting 55 can be performed as needed. After the slat 68 is ejected from the apparatus, another slat can be formed by the next cycle of operation.

I claim:

1. A method of fabricating stiff polymeric plastic slats for use in venetian blinds, comprising the steps of:
   feeding a reel of planar polymeric plastic film into a roller system which includes at least one pair or rotatable entrance guide rollers;
   guiding said polymeric plastic film through at least one pair of rotatable line marker rollers to produce a higher local stress concentration along a center line;
   passing said film through at least one pair of truncated rollers to produce a bend in said film;
   passing said film through a pair of nipping rollers to convert said bend to a fold of approximately 180 degrees to thereby produce tension and compression in a ridge region; and
   flattening said film out by drawings through a pair of soft, rotatable wheels.

2. A method according to claim 1 wherein said step of passing said film through at least one pair of truncated rollers is accomplished by the step of passing said film through at least one pair of truncated rollers to initiate a ridge in said film.

3. A method according to claim 2, wherein said step of guiding said film through a pair of rotatable line marker rollers comprises the step of passing a pretreated planar polymeric film having a concave curvature past a pair of rotatable line marker rollers which curvature compensates for compression and tension to be encountered along the ridge line of the slats being formed so that linear slats are produced.

4. A method according to claim 3 wherein said step of passing said film through at least one pair or truncated rollers in accomplished by the step of passing said film through at least one pair of truncated rollers to producd a bend having a minimum angle of 100 degrees.

5. A method according to claim 1 wherein said step of passing said film through a pair of nipping rollers is accomplished by the step of passing said film through a pair of nipping rollers to produce a fold in said film between 120 degrees and 180 degrees.

6. A method according to claim 5 wherein said step of flattening said film is accomplished by drawing said film through a pair of rotatable wheels composed of rubber, paper or felt.

7. A method according to claim 1 wherein said step of feeding a reel of planar polymeric plastic film is accomplished by feeding a reel of planar polymeric plastic selected from the group consisting of polyester film, polycarbonate film, polyvinyl chloride, and other flexible plastic films.

8. A method according to claim 7 wherein said step of feeding a reel of planar polymeric plastic film is accomplished by feeding a reel of planar polymeric plastic film having a thickness from about 0.005 inch to about 0.030 inch.

9. A method according to claim 8 wherein said step of feeding a reel of planar polymeric plastic film is accomplished by the step of feeding a reel of transparent planar polymeric plastic film.

* * * * *